(12) United States Patent
Teufel

(10) Patent No.: US 7,101,453 B2
(45) Date of Patent: Sep. 5, 2006

(54) PRE-FILLED CONTAINED MEDIA VOLUMES AND METHODS OF MEDIA FILLING USING PRE-FILLED CONTAINED MEDIA VOLUMES

(75) Inventor: Paul Teufel, Los Alamitos, CA (US)

(73) Assignee: Toyota Motor Sales U.S.A., Inc., Torrance, CA (US)

( * ) Notice: Subject to any disclaimer, the term of this patent is extended or adjusted under 35 U.S.C. 154(b) by 411 days.

(21) Appl. No.: 10/653,993

(22) Filed: Sep. 4, 2003

(65) Prior Publication Data
US 2004/0216805 A1 Nov. 4, 2004

Related U.S. Application Data

(60) Provisional application No. 60/407,692, filed on Sep. 4, 2002.

(51) Int. Cl.
*B65H 81/00* (2006.01)
(52) U.S. Cl. .................. 156/192; 156/169; 156/173; 156/175; 156/184; 156/189; 156/293
(58) Field of Classification Search ............. 156/169, 156/172, 173, 175, 184, 192, 189, 293
See application file for complete search history.

(56) References Cited

U.S. PATENT DOCUMENTS

| | | | |
|---|---|---|---|
| 2,517,902 A | 8/1950 | Luebkeman | |
| 3,008,859 A * | 11/1961 | Smack | ............. 156/189 |
| 4,783,232 A | 11/1988 | Carbone et al. | |
| 4,822,444 A | 4/1989 | Weingart et al. | |
| 4,869,761 A | 9/1989 | Weingart et al. | |
| 4,907,754 A | 3/1990 | Vaniglia | |
| 4,938,824 A | 7/1990 | Youngkeit | |
| 5,022,952 A | 6/1991 | Vaniglia | |
| 5,059,377 A | 10/1991 | Ashton et al. | |
| 5,223,067 A | 6/1993 | Hamamoto et al. | |
| 5,242,523 A | 9/1993 | Willden et al. | |
| 5,259,901 A | 11/1993 | Davis et al. | |
| 5,262,121 A | 11/1993 | Goodno | |
| 5,266,137 A | 11/1993 | Hollingsworth | |
| 5,362,345 A | 11/1994 | Stettler et al. | |
| 5,378,109 A | 1/1995 | Lallo et al. | |
| 5,447,765 A | 9/1995 | Crane | |
| 5,571,357 A | 11/1996 | Darrieux et al. | |
| 5,925,297 A | 7/1999 | Noto | |

(Continued)

FOREIGN PATENT DOCUMENTS

EP  0 770 472 A1  5/1997

(Continued)

OTHER PUBLICATIONS

John Berry, International Search Report for International Application No. PCT/US01/43091 (Jul. 17, 2002).

(Continued)

*Primary Examiner*—Jeff H. Aftergut
(74) *Attorney, Agent, or Firm*—Finnegan, Henderson, Farabow, Garrett & Dunner, LLP

(57) ABSTRACT

The present invention relates to pre-filled contained media volumes and methods of media filling using pre-filled contained media volumes. In particular, the present invention relates to apparatus and methods of media filling a tooling for a fuselage using pre-filled contained media volumes. In one implementation, the pre-filled contained media volume comprises a bag formed of a porous fabric and media located in that bag. The pre-filled contained media volume is attached to a tooling prior to filling the tooling with additional media.

37 Claims, 12 Drawing Sheets

U.S. PATENT DOCUMENTS

| | | | |
|---|---|---|---|
| 6,086,524 | A | 7/2000 | Martin |
| 6,096,164 | A | 8/2000 | Benson et al. |
| 6,179,945 | B1 | 1/2001 | Greenwood et al. |
| 6,190,598 | B1 | 2/2001 | Murphy et al. |
| 2002/0056788 | A1 | 5/2002 | Anderson et al. |
| 2002/0069962 | A1 | 6/2002 | Maxwell et al. |
| 2003/0052212 | A1 | 3/2003 | Anderson et al. |

FOREIGN PATENT DOCUMENTS

| | | |
|---|---|---|
| EP | 0 786 330 A2 | 7/1997 |
| EP | 1 005 978 A2 | 6/2000 |
| FR | 2 424 470 | 11/1979 |
| FR | 2 664 529 | 1/1992 |
| GB | 1 481 167 | 7/1977 |
| GB | 2 232 954 A | 1/1999 |
| JP | 0 4179515 | 6/1992 |
| WO | WO 98/32589 | 7/1998 |

OTHER PUBLICATIONS

J. Carre, International Search Report for International Application No. PCT/US02/05094 (Aug. 2, 2002).

D.V. Rosato et al., "Filament Winding: Its Development, Manufacture, Applications, and Design," John Wiley & Sons, Inc., (1964).

A. Van Wallene, International Search Report for International Application No. PCT/US01/45750 (Sep. 19, 2002).

McMaster-Carr Supply Company Catalog 105, p. 1581 (1999).

* cited by examiner

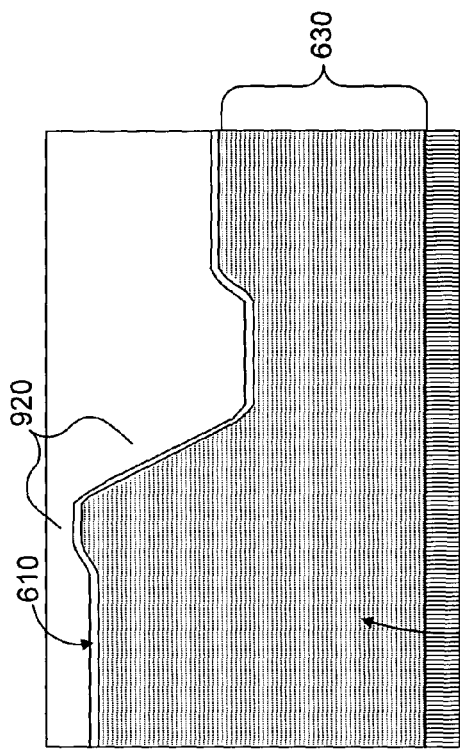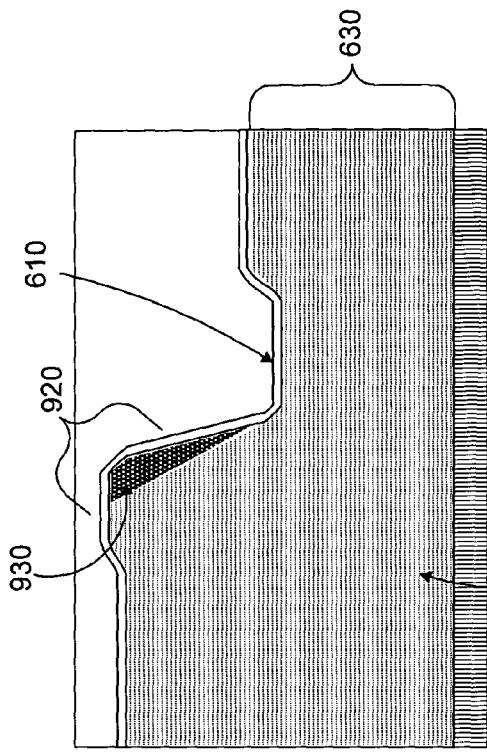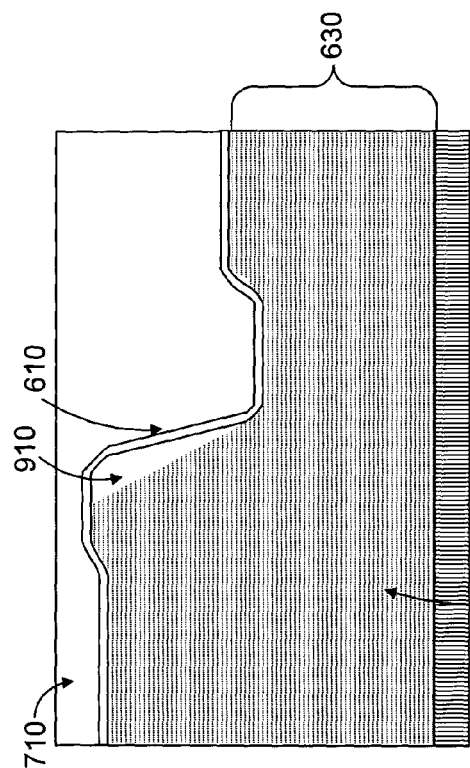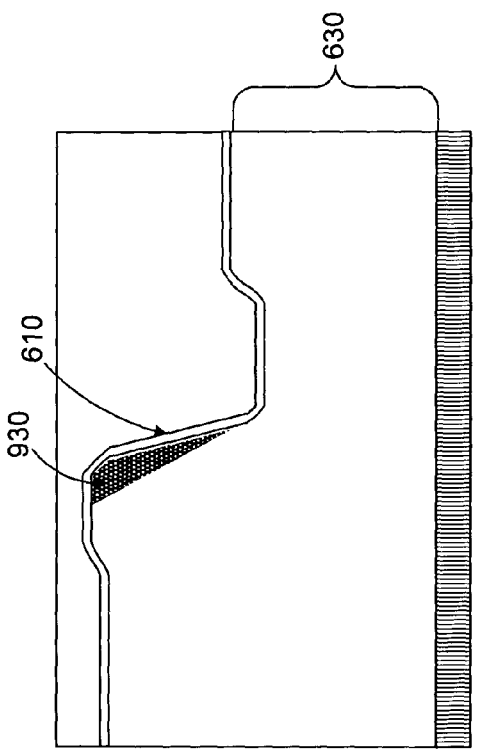

PRE-FILLED CONTAINED MEDIA VOLUMES AND METHODS OF MEDIA FILLING USING PRE-FILLED CONTAINED MEDIA VOLUMES

I. CROSS-REFERENCE TO RELATED APPLICATION

This application claims the benefit of U.S. Provisional Application No. 60/407,692, filed Sep. 4, 2002, by Paul Teufel and titled PRE-FILLED CONTAINED MEDIA VOLUMES AND METHODS OF MEDIA FILLING USING PRE-FILLED CONTAINED MEDIA VOLUMES, the disclosure of which is expressly incorporated herein by reference.

II. BACKGROUND

A. Technical Field

The present invention relates to pre-filled contained media volumes and methods of media filling using pre-filled contained media volumes. In particular, the present invention relates to apparatus and methods of media filling a tooling using pre-filled contained media volumes.

B. Related Art

Presently, composite materials (such as fiber-reinforced plastics) are increasingly being used to manufacture aircraft. The manufacture of such aircraft includes the manufacture of the fuselage (the central body of the aircraft), the internal frames of the fuselage, and the various other components of the aircraft. Often the manufacture of an aircraft fuselage with composite materials includes the use of a tooling to form the shape of the fuselage. For example, in some manufacturing processes, laminate fibers are wrapped around a tooling, such as a mandrel, to form the fuselage.

In certain applications, this tooling is constructed of elastomeric materials. The use of elastomeric materials provides for increased flexibility in the formation of the shape of the tooling. However, hollow elastomeric tooling does not provide the rigidity often needed during the lay-up and curing process. Therefore, the elastomeric tooling can be filled with a granular media, such as ceramic spheres available under the product name Macrolite, metal balls or shot, metal filings, such as aluminum filings, thermoplastics or any other appropriate granular material, and held under vacuum to provide the necessary rigidity. After curing of the fuselage, the granular media is removed from the tooling, and the tooling is removed from the fuselage.

In the course of filling the tooling with granular media, however, the granular media often does not flow to all interior volumes of the tooling. This may result in void pockets of air where granular media has not filled within the tooling. When the tooling is subsequently held under vacuum, the air in the void pockets of granular media dissipates causing the tooling in the area of the void pocket of granular media to be misshapen. This may lead to an improperly formed fuselage. Thus, there is a need for apparatus and methods for preventing air pockets from forming during media filling.

III. SUMMARY OF THE INVENTION

Apparatus and methods consistent with the invention may provide for a method of filling a tooling with a granular media. The method includes filling a contained volume with a first granular media; attaching the contained volume in a portion of the tooling; and filling the tooling with a second granular media.

Apparatus and methods consistent with the invention may also provide for a method of manufacturing a fuselage using a tooling. The method includes preparing the tooling; filling a contained volume with a first granular media; attaching the contained volume in a portion of the tooling; filling the tooling with a second granular media; applying a curable resin to a fiber; applying the fiber over the tooling to form the fuselage; curing the fuselage; removing the media from the tooling; and extracting the tooling from the fuselage.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

FIG. 9A is a cut-away view of introducing granular media into a mandrel without a pre-filled contained media volume, as shown in FIG. 8;

FIG. 9B is a cut-away view of a media-filled mandrel without a pre-filled contained media volume, as shown in FIG. 9A;

FIG. 9C is a cut-away view of a mandrel with a pre-filled contained media volume consistent with an embodiment of the invention, as shown in FIG. 8;

FIG. 9D is a cut-away view of a media-filled mandrel with a pre-filled contained media volume consistent with an embodiment of the present invention, as shown in FIG. 9A;

V. DESCRIPTION OF THE EMBODIMENTS

A. Introduction

Apparatus and methods consistent with the present invention will now be described with respect to pre-filled contained media volumes and methods of media filling using pre-filled contained media volumes. The following examples are only representative of embodiments and implementations in accordance with the invention. Other embodiments and other implementations may also be used.

B. Apparatus and Methods

Figure 1:
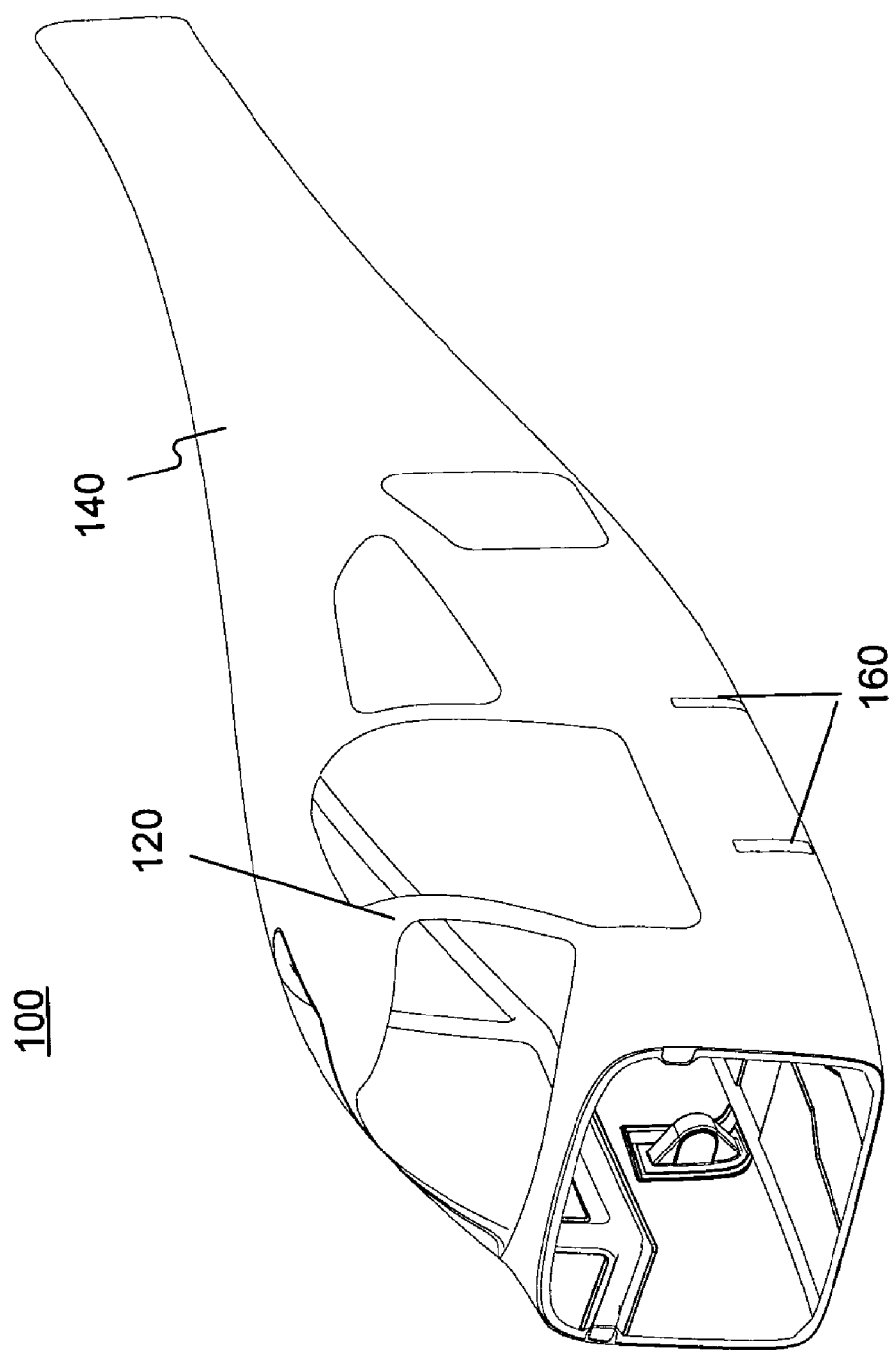
FIG. 1 is a perspective view of a fuselage for an aircraft.

FIG. 1 is a perspective view of a fuselage for an aircraft. As shown in FIG. 1, a fuselage 100 comprises a fuselage skin 140, frame sections 120, and attachment fittings 160 for wings. Fuselage 100 may also comprise other frame sections, attachments fittings, and flanges (not shown). Fuselage 100 may also comprise other components and subcomponents (not shown).

Figure 2:
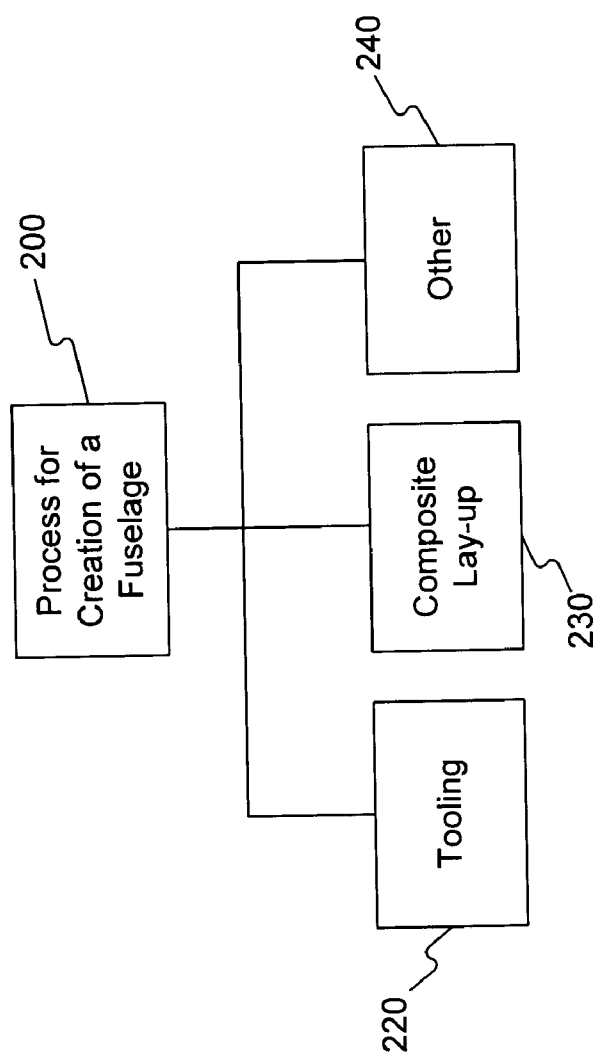
FIG. 2 is a block diagram illustrating a process for creating a fuselage, as shown in FIG. 1.

FIG. 2 is a block diagram illustrating a process for creating a fuselage, as shown in FIG. 1. As shown in FIG. 2, a process for creation of a fuselage 200 includes tooling 220, composite lay-up 230, and other 240. Tooling 220 includes any process utilizing tooling for manufacturing a fuselage. For example, tooling 220 may include the use of metal molds, molds made from composite materials, and/or mandrels made from metals and composite materials. Tooling 220 also includes the use of toolings made from elastomeric materials such as silicone, urethane, latex, or natural rubbers. Tooling 220 further includes the use of such elements as plastic or metal dies and punches.

Composite lay-up 230 includes the use of any appropriate composite material to form the skin of a fuselage. Composite lay-up 230 may include hand lay-up of composite plies, integration of tooling and lay-up, and filament winding, as well as other processes. Other 240 may include such processes as molding, integration of tooling and molding, and filament winding as well as other processes.

Figure 3:
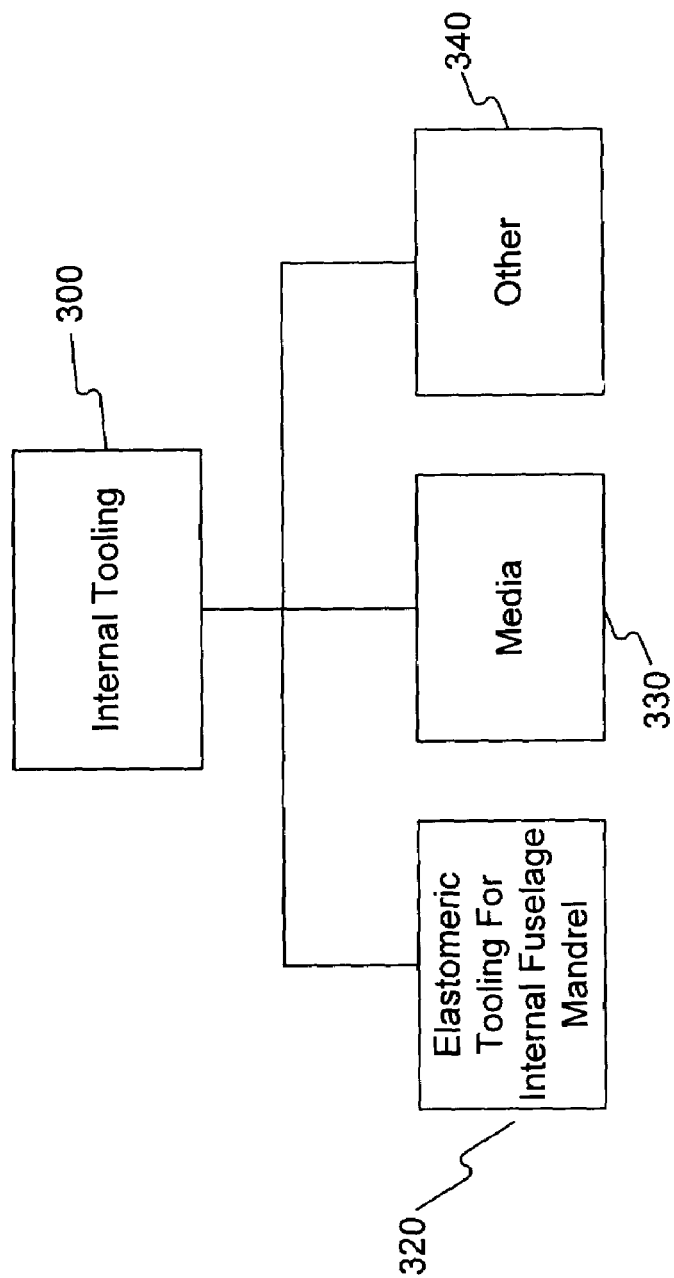
FIG. 3 is a block diagram illustrating the components of an internal tooling for manufacturing a fuselage consistent with an embodiment of the present invention, as shown in FIG. 2.

FIG. 3 is a block diagram illustrating the components of an internal tooling for manufacturing a fuselage consistent with an embodiment of the present invention, as shown in FIG. 2. As shown in FIG. 3, internal tooling 300 includes an elastomeric tooling for internal fuselage mandrel 320 made using apparatus and methods consistent with the present invention, granular media 330, and other 340. In this implementation, elastomeric tooling for internal fuselage mandrel 320 refers to an elastomeric bladder filled with granular media 330 to maintain the shape of a fuselage. Granular media 330 includes any appropriate granular material that will rigidize elastomeric tooling for internal fuselage mandrel 320 when a vacuum has been drawn on the tooling. In one implementation, granular media 330 comprises ceramic spheres available under the product name Macrolite. Granular media 330 may comprises other granular material, the elastomeric tooling can be filled with a granular media, such as metal balls or shot, metal filings, such as aluminum filings, thermoplastics or any other appropriate granular material. Other 340 may include any other portions of the tooling. This implementation is merely exemplary, and other implementations may also be used.

Figure 4:
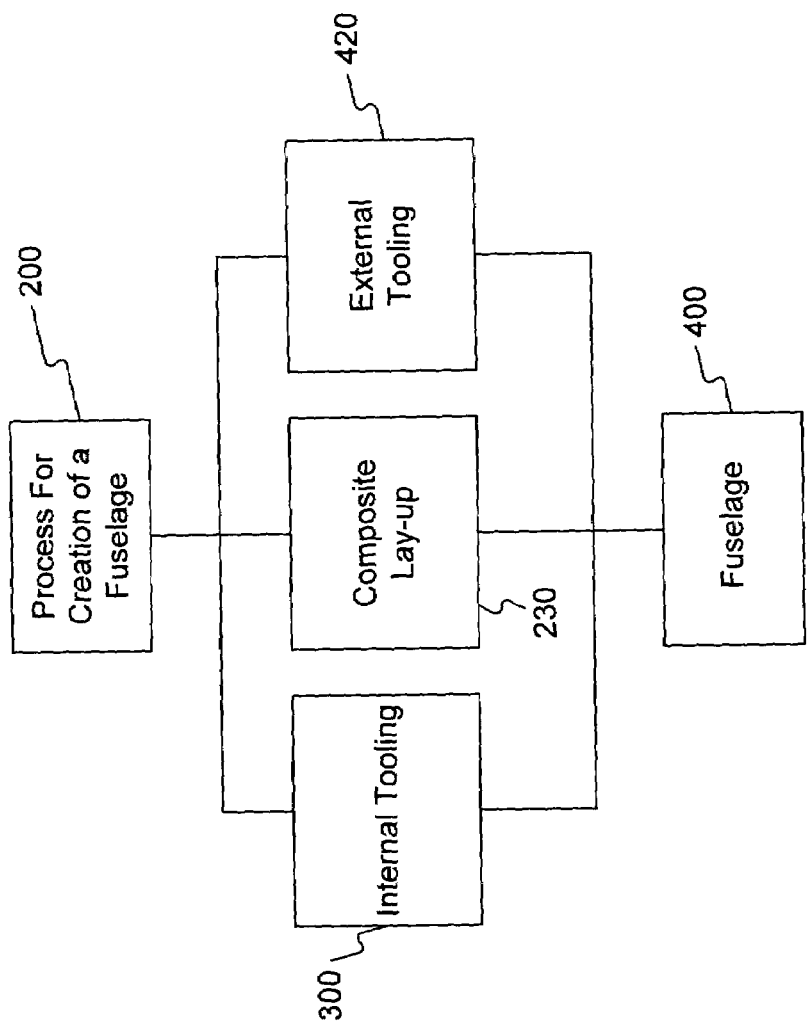
FIG. 4 is a flow diagram illustrating creating a fuselage consistent with an embodiment of the invention, as shown in FIG. 3.

FIG. 4 is a flow diagram illustrating creating a fuselage consistent with an embodiment of the invention, as shown in FIG. 3. As shown in FIG. 4, in one implementation, a process for creation of a fuselage 200 comprises internal tooling 300, composite lay-up 230, and external tooling 420. External tooling 420 includes the use of any appropriate tooling to shape the exterior of a fuselage. In one implementation, external tooling 420 includes the use of a circumferential external tool. As shown in FIG. 4, in this implementation, the process for the creation of a fuselage 200 comprises the combination of internal tooling 300, composite lay-up 230, and external tooling 420, which results in fuselage 400. This implementation is merely exemplary, and other implementations may also be used.

Figure 5:
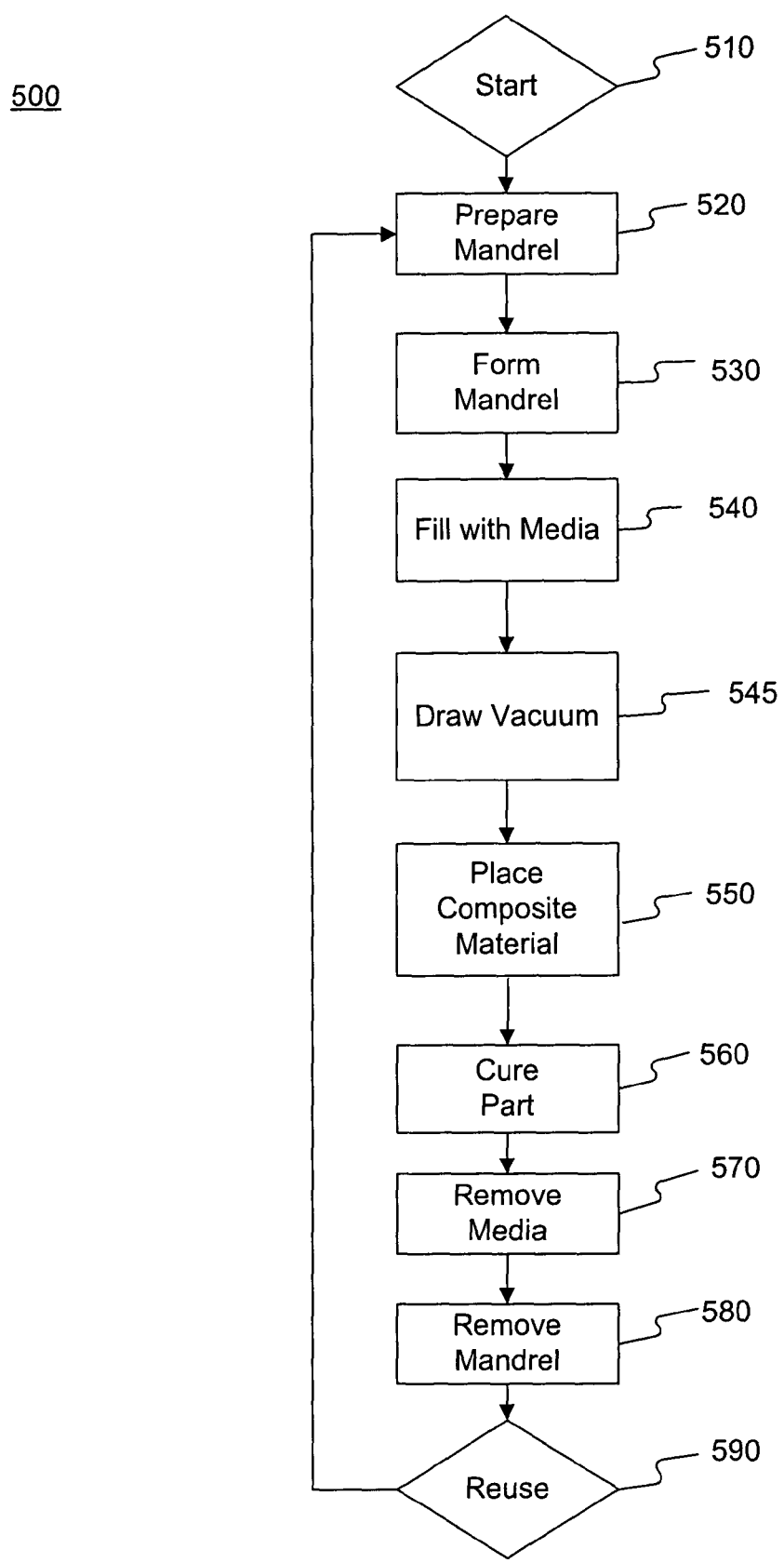
FIG. 5 is a flow diagram illustrating a process for creating a fuselage using a mandrel tooling in accordance with one embodiment of the present invention, as shown in FIG. 4.

FIG. 5 is a flow diagram illustrating a process for creating a fuselage using a mandrel tooling in accordance with one embodiment of the present invention, as shown in FIG. 4. As shown in FIG. 5, in one implementation, process 500 comprises start 510, prepare mandrel 520, form mandrel 530, fill with media 540, draw vacuum 545, place composite material 550, cure part 560, remove media 570, remove mandrel 580, and reuse 590.

In this implementation, process 500 begins with start 510. After start 510 is prepare mandrel 520. In this implementation, prepare mandrel 520 comprises installation of the mandrel in a forming tool. In one implementation, the mandrels is an elastomeric bladder. In this implementation, the mandrel is formed to approximate shape from pre-cured silicone material. Other materials, such as latex and nylon, may also be used. In another implementation, pre-filled media volumes, as described below, may be attached to the mandrel and may remain within the mandrel through all phases of process 500. Prepare mandrel 520 is further described in relation to FIGS. 6A–6B.

In this implementation, prepare mandrel 520 is followed by form mandrel 530. Form mandrel 530 comprises the forming of the mandrel to the desired shape of the forming tool. Vacuum or pressure may be used to hold the proper shape of the elastomeric bladder prior to filling. Form mandrel 530 is further described in relation to FIG. 7.

In this implementation, form mandrel 530 is followed by fill with media 540. Fill with media 540 comprises filling the mandrel with granular media. In one implementation, fill with media 540 includes the use of gravity to fill the mandrel with granular media. Fill with media 540 may also comprise compacting the granular media. Fill with media 540 is further described in relation to FIGS. 8–9D.

In this implementation, fill with media 540 is followed by draw vacuum 545. Draw vacuum 545 includes drawing a vacuum on the mandrel to rigidize the mandrel. Removing air and maintaining the media cavity under vacuum substantially rigidizes the mandrel for composite lay-up.

In this implementation, draw vacuum 545 is followed by place composite material 550. Place composite material 550 comprises the hand or machine lay-up of laminate plies (prepreg or similar) onto the fuselage mandrel. Place composite material 550 is further described in relation to FIG. 10.

In this implementation, place composite material 550 is followed by cure part 560. Cure part 560 comprises the heating and pressurization of the composite materials to produce a structurally sound and lightweight fuselage. In one implementation, cure part 560 includes placing the part in a circumferential external mold. Cure part 560 is further illustrated in relation to FIG. 10.

In this implementation, cure part 560 is followed by remove media 570. Remove media 570 comprises the extraction of the granular media from the mandrel. Remove media 570 may also comprise dislodging any compacted granular media. Remove media 570 is further described in relation to FIG. 11.

In this implementation, remove media 570 is followed by remove mandrel 580. Removal mandrel 580 comprises the removal of the mandrel from the fuselage. Remove mandrel 580 is further described in relation to FIG. 12. In one implementation, remove media 570 occurs prior to cure part 560.

In this implementation, remove mandrel 580 is followed by reuse 590. As shown in FIG. 5, after remove mandrel 580, reuse 590 indicates that the mandrel may be used again to form another fuselage.

The stages in FIG. 5 are merely exemplary, and other stages and other implementations may also be used.

FIG. 6A illustrates mandrel preparation consistent with an embodiment of the present invention, as shown in FIG. 5. As shown in FIG. 6A, an internal fuselage mandrel 600 may be used to form the internal shape of a fuselage. In one implementation, internal fuselage mandrel 600 may comprise a bladder 610 and an armature 620. This implementation is merely exemplary, and other implementations may also be used.

As shown in FIG. 6A, bladder 610 creates the internal shape of the fuselage. In one implementation, bladder 610 may be a premolded silicone bag or mandrel 650, such as, for example, a reusable elastomeric mandrel currently available through International Design Technologies, Inc (IDT). Some silicone bag materials that have been found acceptable include those available from D Aircraft Products. In addition, there are other suppliers of high temperature (up to 400° F.), unfilled, and uncured silicone sheet materials that may be used, depending upon the cure temperature of the desired part. Some of the other suppliers include Arlon, Mosite, and Kirkhill. These implementations are merely exemplary, and other implementations may also be used.

Armature 620 is used to support bladder 610. In one implementation, a welded metal armature may be used. However, other materials could be used to form the armature. This implementation is merely exemplary, and other implementations may also be used.

FIG. 6B is a cut-away view of a portion of a mandrel consistent with an embodiment of the present invention, as shown in FIG. 6A. As shown in FIG. 6B, armature 620 may be inserted through bladder 610 to support bladder 610. To minimize weight and mandrel bending, armature 620 may be as large as possible, while allowing it to be removed from the bladder 610. As further shown in FIG. 6B, inserting armature 620 in bladder 610 creates a cavity 630. This implementation is merely exemplary, and other implementations may also be used.

Figure 6:
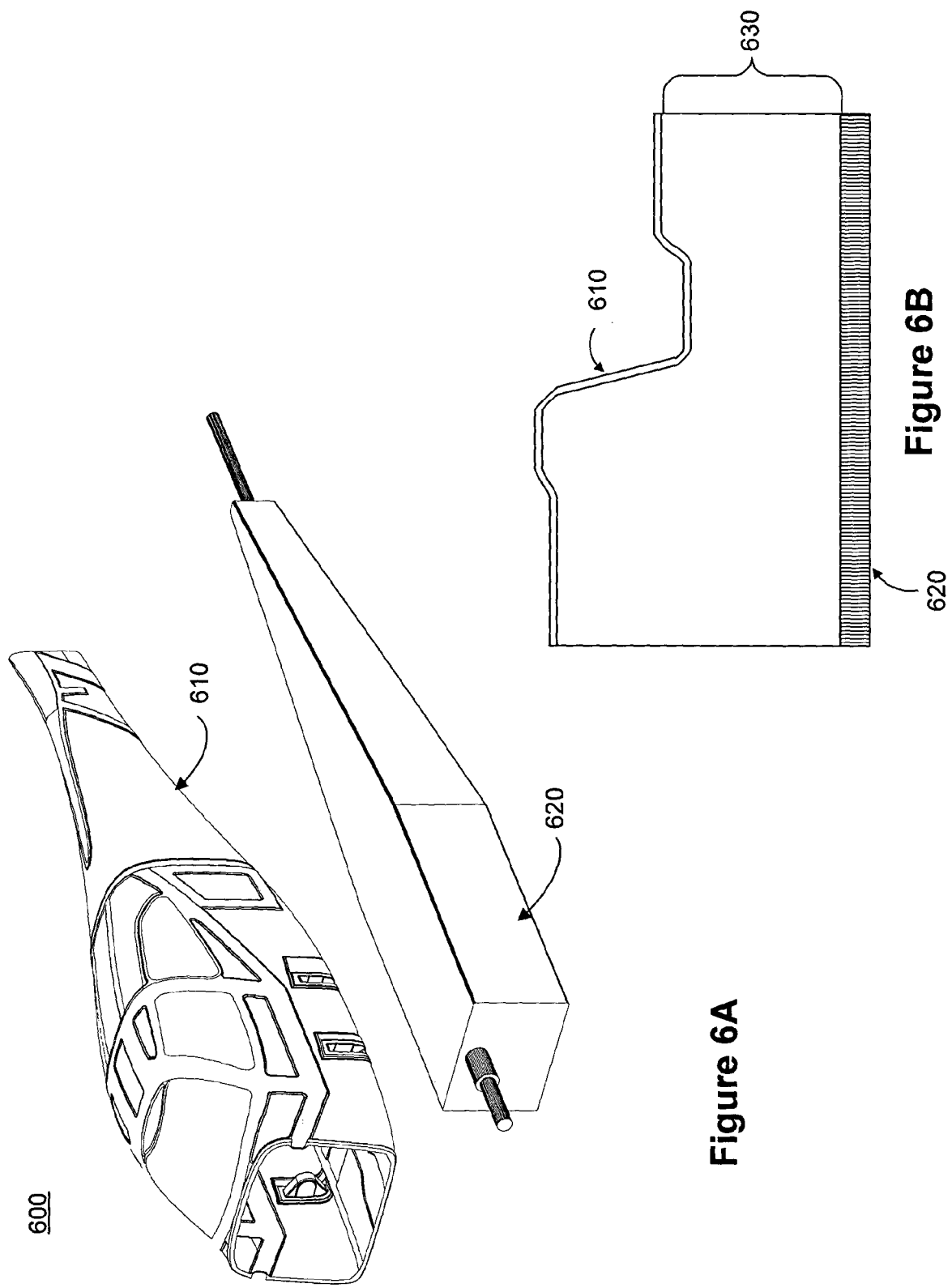
FIG. 6A illustrates mandrel preparation consistent with an embodiment of the present invention, as shown in FIG. 5.
FIG. 6B is a cut-away view of a portion of a mandrel consistent with an embodiment of the present invention, as shown in FIG. 6A.
Figure 7:
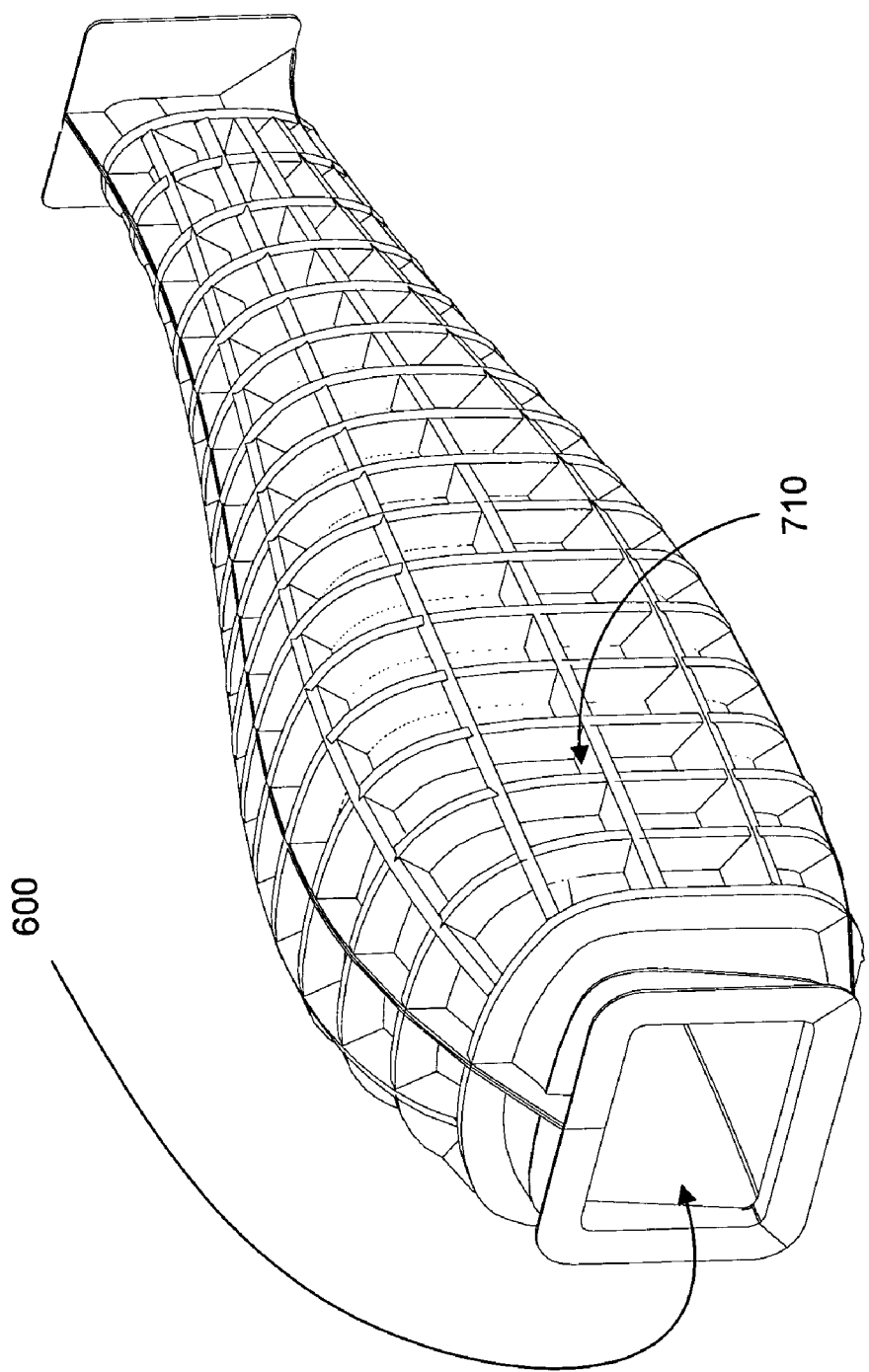
FIG. 7 is a perspective view of a mandrel in a form tool consistent with an embodiment of the present invention, as shown in FIG. 6.

FIG. 7 is a perspective view of a mandrel in a form tool consistent with an embodiment of the present invention, as shown in FIG. 6. As shown in FIG. 7, mandrel 600 is placed in a form tool 710 to form the desired shape of the fuselage. In one implementation, mandrel 600 is filled with air to force mandrel 600 to conform to the shape of the inner surface of form tool 710. In another implementation, a vacuum is used to hold mandrel 600 to the shape of form tool 710. These implementations are merely exemplary, and other implementations may also be used.

Figure 8:
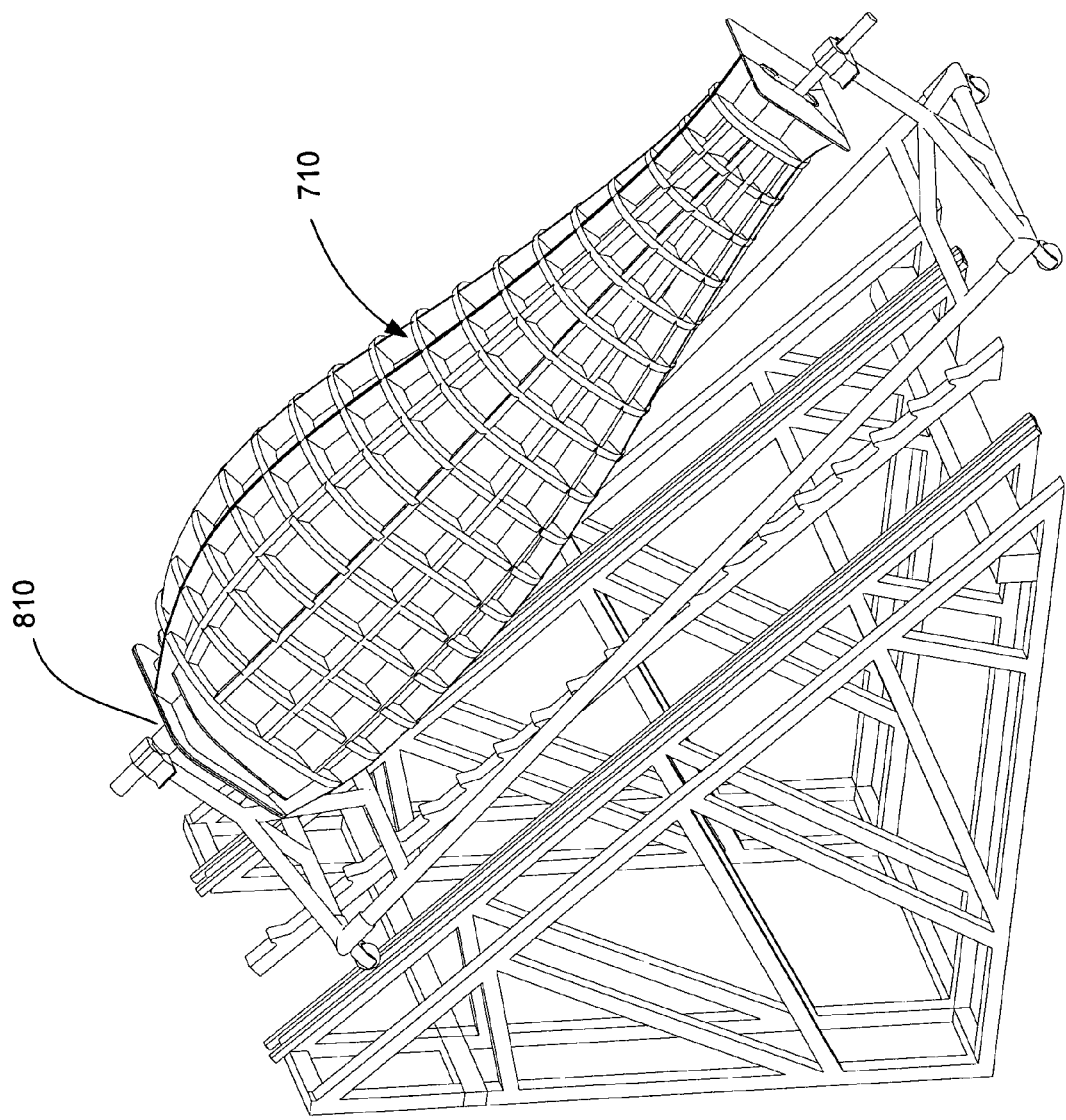
FIG. 8 illustrates introducing granular media into a mandrel consistent with an embodiment of the present invention, as shown in FIG. 7.

FIG. 8 illustrates introducing granular media into a mandrel consistent with an embodiment of the present invention, as shown in FIG. 7. As shown in FIG. 8, granular media 810 may be placed inside bladder 610 of mandrel 600 (as described above), which itself is contained within form tool 710. As shown in FIG. 8, in one implementation, the introduction of granular media 810 is performed in a semi-horizontal orientation. However, in other implementations, other orientations, such as a vertical orientation or any other appropriate orientation, may be used for introducing granular media 810. These implementations are merely exemplary, and other implementations may also be used.

FIG 9A is a cut-away view of introducing granular media into a mandrel without a pre-filled contained media volume, as show in FIG. 8. As shown in FIG. 9A, in one implementation, granular media 810 is introduced into cavity 630. Cavity 630 is located in the space between bladder 610 and armature 620. As shown in FIG. 9A, bladder 610 is contained within form tool 710. As described above, if a vacuum has been applied to form tool 710, when granular media 810 is added, cavity 630 is vented to the atmosphere. Alternatively, as described above, if pressure is applied to the interior of bladder 610, cavity 630 is filled with granular media 810 while pressurized. This implementation is merely exemplary, and other materials and implementations may also be used.

As further shown in FIG. 9A, in some instances, during media filling, granular media 810 may not flow to all parts of cavity 630. This failure to completely fill cavity 630 may leave a void pocket of media 910. FIG. 9A shows one void pocket of media, however, multiple void pockets of media may be formed in any location in cavity 630. This implementation is merely exemplary, and other materials and implementations may also be used.

FIG. 9B is a cut-away view of a media-filled mandrel without a pre-filled contained media volume, as shown in FIG. 9A. In one implementation, following introduction of granular media 810, a vacuum is applied to cavity 630 to rigidize the mandrel. As shown in FIG. 9A, when the vacuum is applied to cavity 630, a section 920 of bladder 610 located by void pocket of media 910 (not shown in FIG. 9B, but shown in FIG. 9A) will be improperly formed. As shown in FIG. 9B, in this implementation, section 920 may collapse inward. In this implementation, the tool must then be reformed to create the desired shape. This implementation is merely exemplary, and other materials and implementations may also be used.

FIG. 9C is a cut-away view of a mandrel with a pre-filled contained media volume consistent with an embodiment of the invention, as shown in FIG. 8. As shown in FIG. 9C, in one implementation, a pre-filled contained media volume 930 may be attached to bladder 610 inside the media cavity 630 located between bladder 610 and armature 620. In one implementation, pre-filled contained media volume 930 is attached in an area likely to exhibit a media void. This implementation is merely exemplary, and other implementations may also be used.

Pre-filled contained media volume 930 includes any container capable of holding granular media and allowing air to readily pass through. In one implementation, a porous fabric container filled with granular media forms a flexible pre-filled contained media volume 930. In another implementation, the porous fabric will be capable of withstanding the cure temperature typical in a composite part curing process. In one implementation in which cure temperature will be approximately 270 degrees Fahrenheit, the porous fabric may comprise fiberglass 7781 cloth weave commonly available from a variety of suppliers. Metallic screens or plastic films may also be used. These implementations are merely exemplary, and other materials and implementations may also be used.

Pre-filled contained media volume 930 may have any appropriate size and shape to fill a desired portion of cavity 630. In one implementation, pre-filled contained media volume 930 may be as small as a small "bean bag" or as large as a pillow, or approximately 1 $in^3$ to 1 $ft^3$. In another implementation, pre-filled contained media volume 930 may be shaped to match the contours of the portion of cavity 630 in which it will be placed. In yet another implementation, pre-filled contained media volume 930 will conform to the shape of the portion of cavity 630 in which it will be placed upon filling cavity 630 with granular media. These implementations are merely exemplary, and other materials and implementations may also be used.

In one embodiment, the granular media within the pre-filled contained media volume 930 is the same as the granular media introduced into cavity 630. However, in other embodiments different granular medias may be used in pre-filled contained media volume 930 and cavity 630. Because less granular media is needed to fill pre-filled contained media volume 930 a heavier or more expensive granular media with more desirable properties may be used in pre-filled contained media volume without substantial increases in cost or weight. These implementations are merely exemplary, and other materials and implementations may also be used.

As described above, pre-filled contained media volume 930 may be attached to bladder 610 prior to filling bladder 610 with granular media. In one implementation, pre-filled contained media volume 930 will be attached using RTV silicone or a similar bonding agent. In another implementation, a plurality of pre-filled contained media volumes 930 may be attached to multiple points in bladder 610, which are likely to form media voids. These implementations are merely exemplary, and other materials and implementations may also be used.

FIG. 9D is a cut-away view of a media-filled mandrel with a pre-filled contained media volume consistent with an embodiment of the present invention, as shown in FIG. 9A. As shown in FIG. 9D, cavity 630 has been filled with granular media 810. In this implementation, a media void 910 (as shown in FIG. 9A), will not form because pre-filled contained media volume 930 is filling the potential media void location. This implementation is merely exemplary, and other materials and implementations may also be used.

As described in FIG. 9B, in one implementation, following introduction of granular media 810, a vacuum is applied to cavity 630 to rigidize the mandrel. As shown in FIG. 9D, in this implementation, when the vacuum is applied to cavity 630 comprising pre-filled contained media volume 930, section 920 of bladder 610 remains in the desired shape, unlike the implementation in FIG. 9B. This implementation is merely exemplary, and other materials and implementations may also be used.

Figure 10:
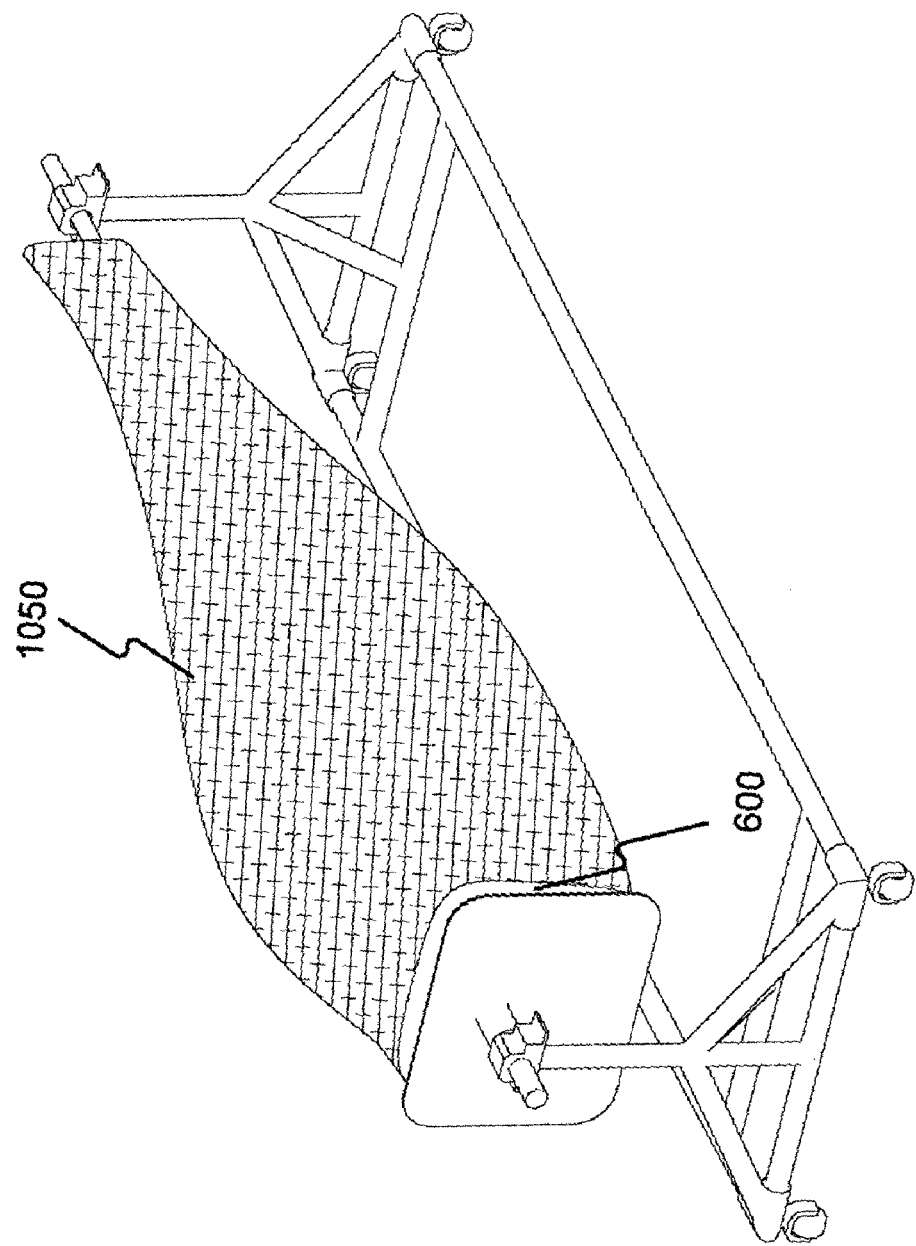
FIG. 10 is a perspective view of a fuselage formed on a mandrel consistent with an embodiment of the invention, as shown in FIG. 9D.

FIG. 10 is a perspective view of a fuselage formed on a mandrel consistent with an embodiment of the invention, as shown in FIG. 9D. As shown in FIG. 10, fuselage 1050 has been formed around fuselage mandrel 600. Any appropriate method may be used to form the fuselage. In one implementation, filament with resin is wound around fuselage mandrel 900 and then cured to form fuselage 1050. This implementation is merely exemplary, and other implementations may also be used.

Figure 11:
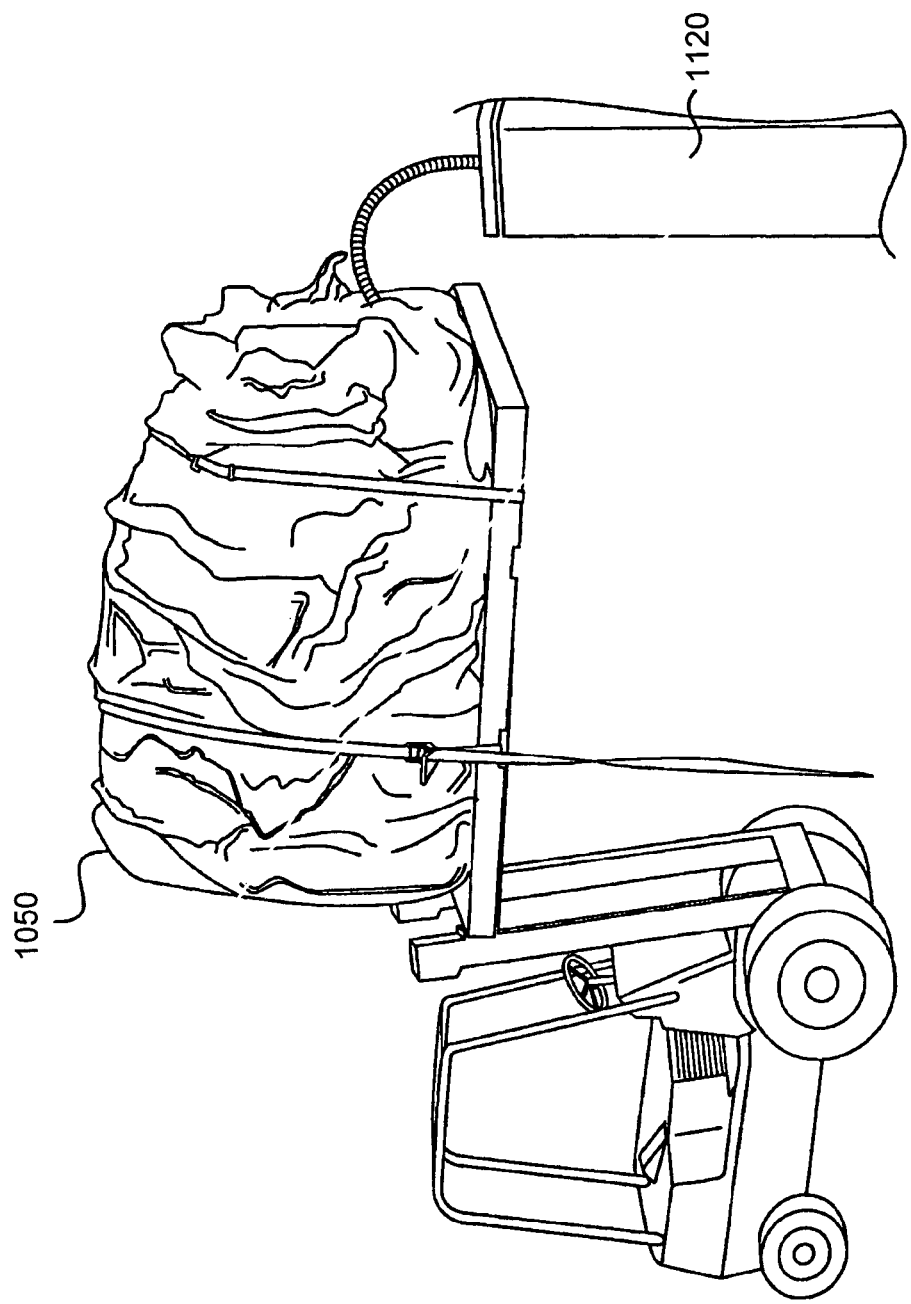
FIG. 11 illustrates removing granular media from a mandrel form consistent with an embodiment of the present invention, as shown in FIG. 10.

FIG. 11 illustrates removing granular media from a mandrel form consistent with an embodiment of the present invention, as show in FIG. 10. As shown in FIG. 11, following the formation of fuselage 1050, granular media 810 (not shown) is removed from fuselage 1050. In one implementation, a vacuum 1120 removes granular media 810 through fill ports (not shown) in armature 620 (also not shown) in bladder 610. In other implementations, tilting and rotating of the tooling and/or the introduction of vibration or air pressure may be used to assist in the removal of the granular media. This implementation is merely exemplary, and other implementations may also be used.

Figure 12:
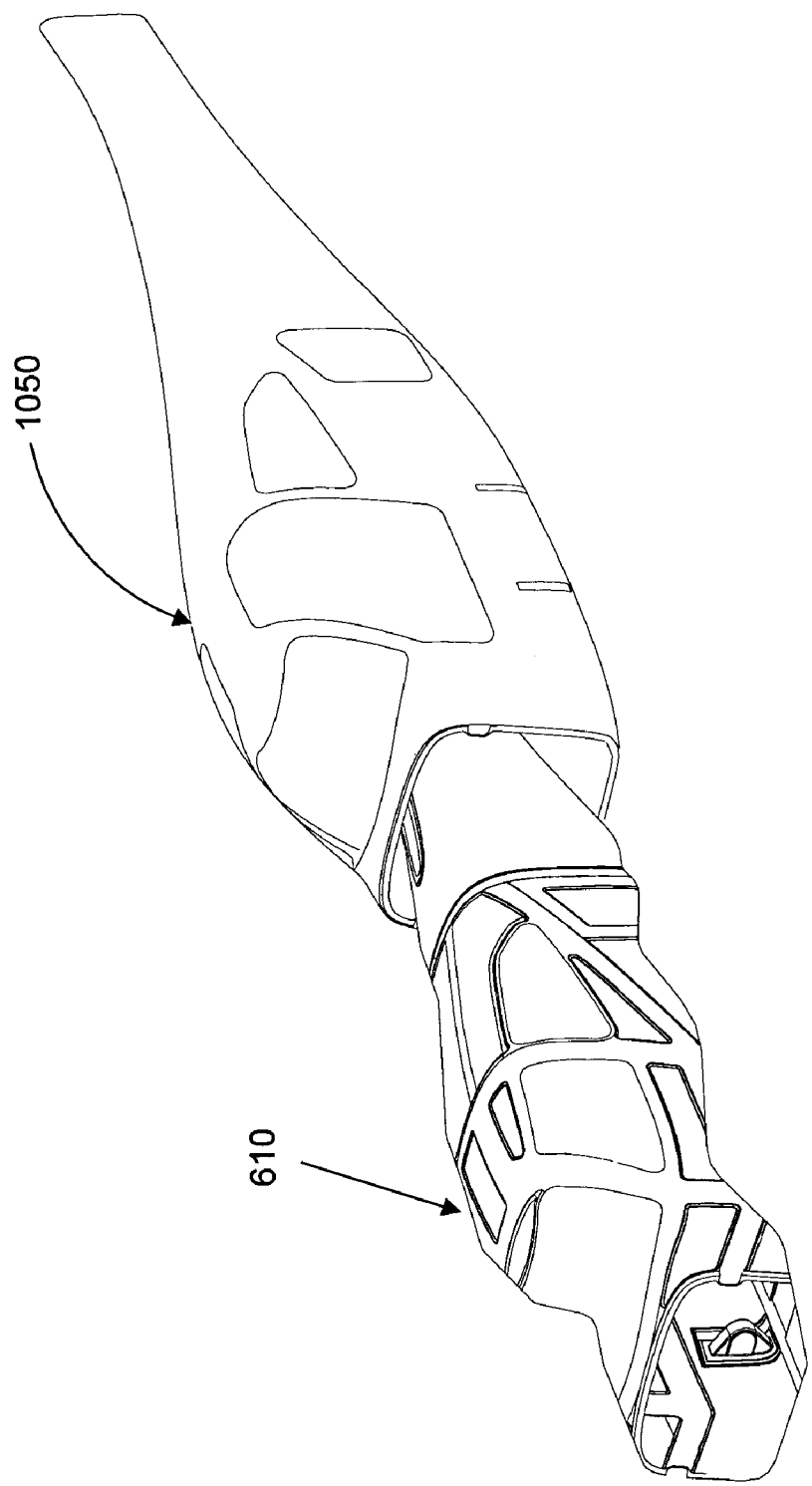
FIG. 12 illustrates removing a mandrel from a mandrel form consistent with an embodiment of the present invention, as shown in FIG. 11.

FIG. 12 illustrates removing a mandrel from a mandrel form consistent with an embodiment of the present invention, as shown in FIG. 11. As shown in FIG. 11, following removal of the granular media and after the removal of armature 620 from fuselage 1050 (not shown), bladder 610 is also removed from fuselage 1050. These implementations are merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A method of filling a tooling with a granular media, comprising:
   filling a contained volume with a first granular media;
   attaching the contained volume in a portion of the tooling; and
   filling the tooling with a second granular media.

2. The method of claim 1, further comprising:
   identifying a portion of the tooling likely to form a void pocket of media when filled with the second granular media; and
   wherein attaching the contained volume further comprises attaching the contained volume in the portion of the tooling likely to form a void pocket of media prior to filling the tooling with the second granular media.

3. The method of claim 1, further comprising applying a vacuum to the tooling.

4. The method of claim 1, further comprising applying air pressure to the tooling.

5. The method of claim 1, wherein the contained volume comprises a flexible bag formed of a porous fabric.

6. The method of claim 5, wherein the porous fabric is formed of a fiberglass cloth weave.

7. The method of claim 5, wherein the porous fabric is formed of a metallic screen.

8. The method of claim 5, wherein the porous fabric is formed of a plastic film.

9. The method of claim 1, wherein attaching further comprises attaching the contained volume with a bonding agent.

10. The method of claim 9, wherein the bonding agent comprises RTV silicone.

11. The method of claim 1, wherein the tooling is a tooling for an aircraft structure.

12. The method of claim 1, wherein the first and second granular media comprise the same material.

13. A computer-implemented method of filling a tooling with a granular media, comprising:
   filling a contained volume with a first granular media;
   attaching the contained volume in a portion of the tooling; and
   filling the tooling with a second granular media.

14. A method of filling a tooling with a media, comprising:

identifying a portion of the tooling likely to form a void pocket of media when filled with a granular media;
filling a contained volume with a first granular media;
attaching the contained volume in the portion of the tooling likely to form a void pocket of media prior to filling the tooling with a second granular media; and
filling the tooling with the second granular media.

15. The method of claim 14, further comprising applying a vacuum to the tooling.

16. The method of claim 14, further comprising applying air pressure to the tooling.

17. The method of claim 14, wherein the contained volume comprises a flexible bag formed of a porous fabric.

18. The method of claim 17, wherein the porous fabric is formed of a fiberglass cloth weave.

19. The method of claim 17, wherein the porous fabric is formed of a metallic screen.

20. The method of claim 17, wherein the porous fabric is formed of a plastic film.

21. The method of claim 14, wherein attaching further comprises attaching the contained volume with a bonding agent.

22. The method of claim 21, wherein the bonding agent comprises RTV silicone.

23. The method of claim 14, wherein the tooling is a tooling for an aircraft structure.

24. The method of claim 14, wherein the first and second granular media comprise the same material.

25. A computer-implemented method of filling a tooling with a media, comprising:
identifying a portion of the tooling likely to form a void pocket of media when filled with a granular media;
filling a contained volume with a first granular media;
attaching the contained volume in the portion of the tooling likely to form a void pocket of media prior to filling the tooling with a second granular media; and
filling the tooling with the second granular media.

26. A method of manufacturing a fuselage using a tooling, comprising: preparing the tooling;
filling a contained volume with a first granular media;
attaching the contained volume in a portion of the tooling;
filling the tooling with a second granular media;
applying a curable resin to a fiber; applying the fiber over the tooling to form the fuselage;
curing the fuselage;
removing the media from the tooling; and
extracting the tooling from the fuselage.

27. The method of claim 26, further comprising:
identifying a portion of the tooling likely to form a void pocket of media when filled with the second granular media; and
wherein attaching the contained volume further comprises attaching the contained volume in the portion of the tooling likely to form a void pocket of media prior to filling the tooling with the second granular media.

28. The method of claim 26, further comprising applying a vacuum to the tooling.

29. The method of claim 26, further comprising applying air pressure to the tooling.

30. The method of claim 26, wherein the contained volume comprises a flexible bag formed of a porous fabric.

31. The method of claim 30, wherein the porous fabric is formed of a fiberglass cloth weave.

32. The method of claim 30, wherein the porous fabric is formed of a metallic screen.

33. The method of claim 30, wherein the porous fabric is formed of a plastic film.

34. The method of claim 26, wherein attaching further comprises attaching the contained volume with a bonding agent.

35. The method of claim 34, wherein the bonding agent comprises RTV silicone.

36. The method of claim 26, wherein the first and second granular media comprise the same material.

37. A computer-implemented method of manufacturing a fuselage using a tooling, comprising:
preparing the tooling;
filling a contained volume with a first granular media;
attaching the contained volume in a portion of the tooling;
filling the tooling with a second granular media;
applying a curable resin to a fiber;
applying the fiber over the tooling to form the fuselage;
curing the fuselage;
removing the media from the tooling; and
extracting the tooling from the fuselage.

* * * * *